United States Patent Office 3,091,420
Patented May 28, 1963

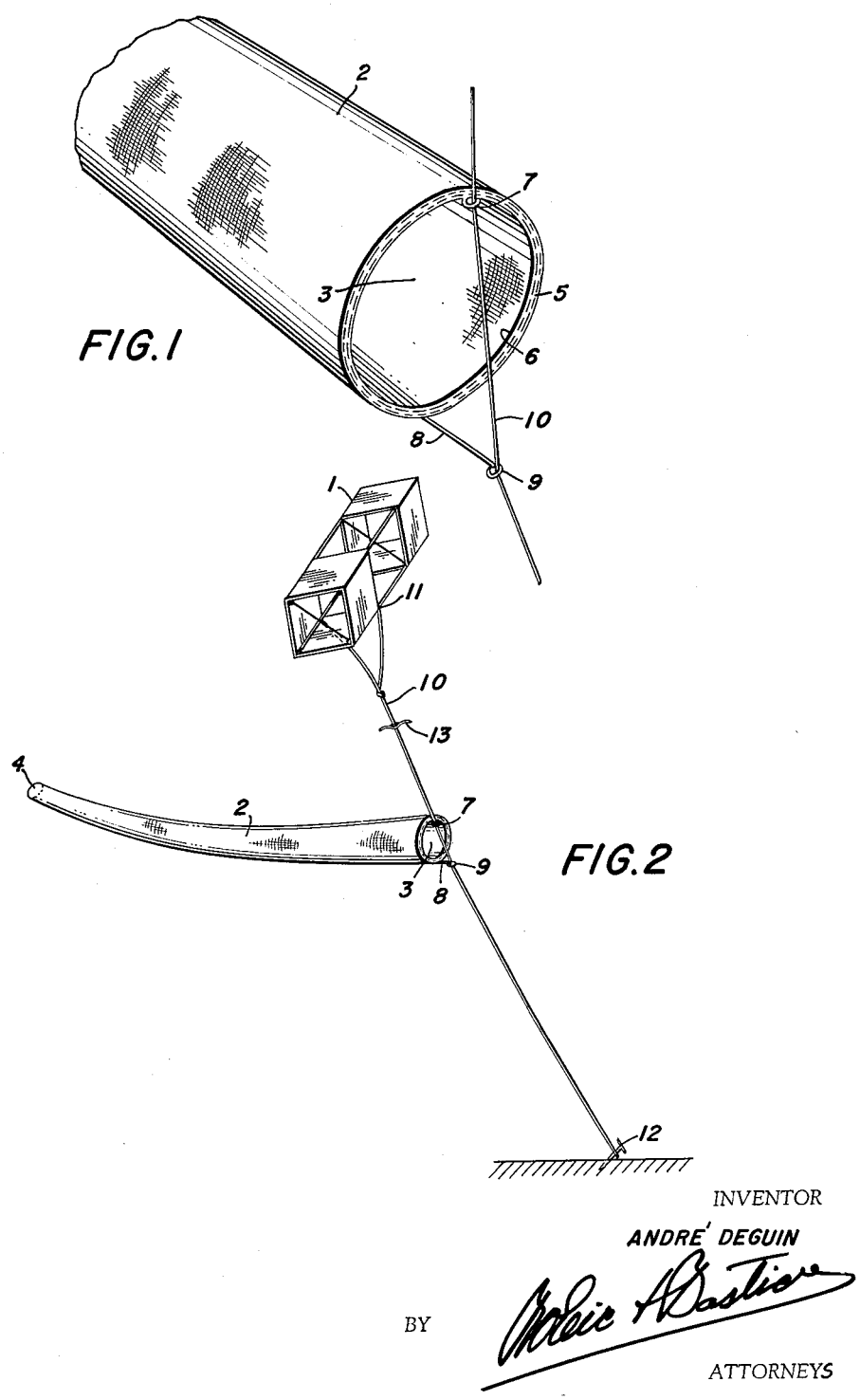

3,091,420
CAPTIVE SELF-LIFTING APPARATUS
André Deguin, 42 Jacob St., Paris 6e, France
Filed May 31, 1961, Ser. No. 113,747
3 Claims. (Cl. 244—155)

The present invention relates to a captive self-lifting apparatus and more particularly to the combination of a known kite and a wind sock.

It is known that wind is necessary if it is intended to keep a kite suspended in the air while being captive, that is, tied to a fixed point. If there is hardly any wind or no wind at all and it is desired to keep the kite flying, it becomes necessary to create a relative wind by moving the kite at a certain speed by means of this holding rope.

One object of the present invention is to provide a captive self-lifting apparatus which results from the combination of a kite and a wind sock, the latter adding its lifting properties to those of the kite and vice-versa, in such a manner that the assembly constitutes a heavier-than-air captive self-lifting apparatus wherein the two elements of the combination mutually cooperate under the action of the wind. In this regard, and in accordance with the invention, this self-lifting apparatus is constituted by a kite of any known type associated with a wind sock having an inlet opening provided with rings through which the holding rope of the kite extends. This will permit the wind sock to rise and glide along the said rope under the action of the wind when the kite is in flying position. The wind sock is vertical at first but gradually moves to a horizontal position. The sock actually never comes to a full stop as it constantly moves along the rope under the influence of wind variations and the tension in the rope.

Other objects of the invention will come to light during the description that follows having reference to the annexed drawings diagrammatically showing an embodiment of the invention. In the drawings:

FIG. 1 is a perspective view of the inlet opening of the wind sock,

FIG. 2 is a perspective view of the assembly as seen flying in the air.

In the drawings, 1 is a kite of any known type, 2 is a common wind sock to which it is associated, made of known material such as cotton, plastic or the like, 3 is the inlet opening of the wind sock and 4 is the outlet opening thereof, the latter being, of course, smaller.

This inlet opening 3 is constituted by a metallic annular circle 5 surrounded by the material 6 at the end of sock 2. This circle is provided with a first ring 7 projecting outwardly of opening 3 and, diametrically opposite to ring 7, with a rod 8 also projecting away from opening 3 and rigidly fixed onto circle 2. This rod 8 is terminated at the free end thereof with a ring 9 similar to ring 7. Rope or cord 10 is tied to the kite at 11, extends through the first ring 7 and then the ring 9 located diametrically across ring 7 and, under optimum conditions, held in the hand or eventually fixed to the ground as at 12.

The operation of the device is as follows: Once the kite 1 is in the air, the end of the holding rope 10 is successively run through rings 7 and 9 and the wind sock to spread out as it is folded on account of its length.

As the wind is usually fairly weak, close to the ground and insufficient to inflate the sock, it becomes necessary to give it a head start after which it may rise by itself along the rope of the kite. The wind sock is almost vertical at first but then as it gradually takes on height, it projects more and more horizontally. Once at the top, and if the wind blows regularly, it may be attached to any fixed point 12; the kite and the wind sock mutually lifting each other under the power of the wind and the wandering of the kite.

For landing, it is only necessary to pull gently on the rope 10, without jolts, so as not to damage the wind sock which is usually made of light material.

The embodiment just described and shown on the drawing has only been given, of course, as an example and should not be considered as strictly limiting the invention. Other embodiments could be derived therefrom, which would be within tthe scope of the invention.

As to the possible uses of the device, they are of course not limited but it is actually considered particularly in view of aerial publicity, particularly by inscriptions and pictures placed on the material of the wind sock which, because of its horizontal position, helps easy reading and examination. In view of such a use, it would be convenient to put on the holding rope, a few meters below the kite, a stop 13 which will prevent the wind sock from coming against the kite which would hide the inscriptions or make them hard to read.

The invention could also be used as a toy, for example, on beaches or in any location exposed to the wind.

What I claim:

1. A self-lifting device comprising a kite; a holding rope attached to said kite; a generally tubular elongated flexible wind sock having an inlet opening at one end thereof and an outlet opening at the other end thereof; rigid means defining said inlet opening; two rings mounted on said rigid means diametrically opposite from one another; said holding rope being adapted to freely extend successively through said rings whereby said wind sock is freely movable about said rope so that under the influence of the wind, the kite and the wind sock mutually cooperate to keep the device in the air.

2. A device as claimed in claim 1 wherein said rigid means is a metallic circle that keeps the wind sock inlet opening wide open at all times; one of said rings being directly fixed on to said circle whereas the other ring is located at the extreme end of a rod secured to, and projecting from, the circle at a location diametrically opposed to that of the first ring.

3. A device as claimed in claim 2 wherein said rope is provided with stop means adjacent the kite to prevent the sock from coming against the kite.

References Cited in the file of this patent

UNITED STATES PATENTS

| | | |
|---|---|---|
| 1,718,551 | Fisher | June 25, 1929 |
| 2,941,765 | Feldman | June 21, 1960 |